(12) United States Patent
Nishimura et al.

(10) Patent No.: US 8,145,173 B2
(45) Date of Patent: Mar. 27, 2012

(54) RECEIVER AND ELECTRONIC APPARATUS HAVING DIVERSITY AND SINGLE RECEIVING MODES

(75) Inventors: Daisuke Nishimura, Osaka (JP); Hiroaki Ozeki, Osaka (JP); Yoshio Fuwa, Gifu (JP); Kazuyori Doumoto, Aichi (JP)

(73) Assignee: Panasonic Corporation, Osaka (JP)

( * ) Notice: Subject to any disclaimer, the term of this patent is extended or adjusted under 35 U.S.C. 154(b) by 938 days.

(21) Appl. No.: 12/159,811

(22) PCT Filed: Nov. 21, 2007

(86) PCT No.: PCT/JP2007/072499
§ 371 (c)(1),
(2), (4) Date: Jul. 1, 2008

(87) PCT Pub. No.: WO2008/072451
PCT Pub. Date: Jun. 19, 2008

(65) Prior Publication Data
US 2009/0203348 A1  Aug. 13, 2009

(30) Foreign Application Priority Data
Dec. 15, 2006 (JP) .................................. 2006-338111
Dec. 15, 2006 (JP) .................................. 2006-338112

(51) Int. Cl.
*H04B 1/10* (2006.01)
(52) U.S. Cl. .................. 455/275; 455/318; 455/323
(58) Field of Classification Search .................. 455/132, 455/133, 137, 139, 140, 296, 300, 303, 304, 455/306, 310, 574, 272, 273, 275, 276.1, 455/278.1, 318, 323
See application file for complete search history.

(56) References Cited

U.S. PATENT DOCUMENTS

| | | | | |
|---|---|---|---|---|
| 4,406,017 A | * | 9/1983 | Takahashi | 455/137 |
| 4,769,825 A | * | 9/1988 | Vogel | 375/267 |
| 6,009,310 A | * | 12/1999 | Motohashi | 340/7.43 |
| 6,600,907 B1 | * | 7/2003 | Taguchi | 455/132 |
| 6,678,508 B1 | | 1/2004 | Koilpillai et al. | |
| 7,269,396 B2 | * | 9/2007 | Vogt et al. | 455/135 |
| 2005/0090207 A1 | | 4/2005 | Oiwa | |
| 2006/0166638 A1 | * | 7/2006 | Iwaida | 455/318 |

FOREIGN PATENT DOCUMENTS

| | | |
|---|---|---|
| JP | 2001-119310 A | 4/2001 |
| JP | 2003-523126 A | 7/2003 |
| JP | 2005-130279 A | 5/2005 |
| JP | 2007-074418 A | 3/2007 |

OTHER PUBLICATIONS

Japanese Office Action for Application No. 2008-521669, Oct. 5, 2010, Panasonic Corporation.
International Search Report for PCT/JP2007/072499 dated Feb. 5, 2008.

* cited by examiner

*Primary Examiner* — Blane J Jackson
(74) *Attorney, Agent, or Firm* — RatnerPrestia

(57) ABSTRACT

A receiver includes a first receiving section, a second receiving section, and a controller. A controller is operable to switch between a diversity receiving mode in which both of the first receiving section and the second receiving section are activated and a single receiving mode in which the first receiving section is activated while the second receiving section is deactivated. The controller allows the first mixer to heterodyne the signal output from the first RF amplifier with using the second oscillation signal and output the heterodyned signal in the first single receiving mode.

19 Claims, 4 Drawing Sheets

RECEIVER AND ELECTRONIC APPARATUS HAVING DIVERSITY AND SINGLE RECEIVING MODES

THIS APPLICATION IS A U.S. NATIONAL PHASE APPLICATION OF PCT INTERNATIONAL APPLICATION NO. PCT/JP2007/072499.

TECHNICAL FIELD

The present invention relates to a receiver for receiving a signal having a desired frequency, and to an electronic apparatus including the receiver.

BACKGROUND ART

FIG. 3 is a block diagram of conventional receiver 1 disclosed in Patent Document 1. Receiver 1 includes first receiving section 2 and second receiving section 3. First receiving section 2 includes first antenna terminal 4, first radio-frequency (RF) amplifier 5 having an input port connected to first antenna terminal 4, first mixer 6 having a first input port connected to an output port of first RF amplifier 5, and first local oscillator 7 connected to a second input port of first mixer 6. Second receiving section 3 includes second antenna terminal 8, second RF amplifier 9 having an input port connected to second antenna terminal 8, second mixer 110 having a first input port connected to an output port of second RF amplifier 9, and second local oscillator 111 connected to a second input port of second mixer 110.

When a receiving condition is not better than a predetermined level due to an influence of fading during moving, receiver 1 is put into a diversity receiving mode in which both of first receiving section 2 and second receiving section 3 receive a signal. On the other hand, when the receiving condition becomes better than the predetermined level stably, receiver 1 is put into a single receiving mode in which one of first receiving section 2 and second receiving section 3 exclusively receives the signal. This operation provides receiver 1 with high sensitivity even in a poor receiving condition due to the moving. Further, when the receiving condition becomes better, receiver 1 can turn off one of the receiving sections, accordingly reducing power consumption.

In the single receiving mode in which first receiving section 2 of receiver 1 is activated, first mixer 6 heterodynes a signal having a desired frequency supplied from first antenna terminal 4 to a signal having an intermediate frequency with using an oscillation signal output from first local oscillator 7. First antenna terminal 4 may receive an interference signal having an adjacent frequency within a predetermined range from a sum of or a difference between a frequency of the oscillation signal and the desired frequency. In this case, If first RF amplifier 5 is not sufficiently isolated from first local oscillator 7, first RF amplifier 5 mixes the interference signal with a noise having the frequency of the oscillation signal emitted from first local oscillator 7 and generates a distortion signal having a frequency close to the desired frequency, hence having a receiving quality deteriorate.

Receiver 1 has been recently demanded to have a small size. Therefore, first receiving section 2 and second receiving section 3 are mounted onto a small multilayer circuit board as a single module, or are integrated into a small semiconductor package. These arrangements cause first RF amplifier 5 to be hardly isolated from first local oscillator 7, accordingly causing the above problem to occur.

FIG. 4 is a block diagram of another conventional receiver 101 disclosed in Patent Document 1. Receiver 101 includes first receiving section 102 and second receiving section 103. First receiving section 102 includes first antenna terminal 104, first RF amplifier 105 having an input port connected to first antenna terminal 104, first mixer 106 having a first input port connected to an output port of first RF amplifier 105, and first local oscillator 107 connected to a second input port of first mixer 106. Second receiving section 103 includes second antenna terminal 108, second RF amplifier 109 having an input port connected to second antenna terminal 108, second mixer 10 having a first input port connected to an output port of second RF amplifier 109, and second local oscillator 11 connected to a second input port of second mixer 10 and the second input port of first mixer 106.

In a diversity receiving mode in which both of first receiving section 102 and second receiving section 103 receive a signal, first mixer 106 heterodynes a signal output from RF amplifier 105 with using an oscillation signal output from first local oscillator 107. Second mixer 110 heterodynes a signal output from RF amplifier 109 with using the oscillation signal output from first local oscillator 107. Since second receiving section 103 uses first local oscillator 107 commonly with receiving section 102, receiver 101 can turn off second local oscillator 111 to reduce power consumption in the diversity receiving mode.

In receiver 101, first antenna 104 receives an interference signal having an adjacent frequency within a predetermined range from a sum of or a difference between a frequency of the oscillation signal and the desired frequency. In this case, if first RF amplifier 105 is not isolated sufficiently from first local oscillator 107, first RF amplifier 105 mixes the interference signal with a noise having the frequency of the oscillation signal emitted from first local oscillator 107, and generates a distortion signal having a frequency close to the desired frequency, hence having a receiving quality deteriorate.

Receiver 101 has been recently demanded to have a small size. Therefore, first receiving section 102 and second receiving section 103 are mounted onto a small multilayer circuit board as a single module, or are integrated into a small semiconductor package. These arrangements cause first RF amplifier 105 to be hardly isolated from first local oscillator 107, accordingly causing the above problem.

Patent Document 1: Japanese Patent Laid-Open Publication No. 2005-130279

SUMMARY OF THE INVENTION

A receiver includes a first receiving section, a second receiving section, and a controller. The first receiving section includes a first radio frequency (RF) amplifier amplifying a signal supplied from a first antenna terminal and outputting the amplified signal, a first local oscillator outputting a first oscillation signal, and a first mixer heterodyning a signal output from the first RF amplifier with using the first oscillation signal and outputting the heterodyned signal. The second receiving section includes a second RF amplifier amplifying a signal supplied from a second antenna terminal and outputting the amplified signal, a second local oscillator outputting a second oscillation signal, and a second mixer heterodyning a signal output from the second RF amplifier with using the second oscillation signal and outputting the heterodyned signal. The controller is operable to switch between a diversity receiving mode in which both of the first receiving section and the second receiving section are activated and a single receiving mode in which the first receiving section is activated while the second receiving section is deactivated. The controller allows the first mixer to heterodyne the signal output from the first RF amplifier with using the second oscillation signal and output the heterodyned signal in the first single receiving mode.

This receiver has a high receiving quality.

REFERENCE NUMERALS

12 Receiver
15 First Receiving Section
18 Second Receiving Section
20 First Antenna Terminal
21 First RF Amplifier
22 First Mixer
26 First Local Oscillator
28 Second Antenna Terminal
29 Second RF Amplifier
30 Second Mixer
34 Second Local Oscillator
38 Combining Unit
112 Receiver
115 First Receiving Section
118 Second Receiving Section
120 First Antenna Terminal
121 First RF Amplifier
122 First Mixer
126 First Local Oscillator
128 Second Antenna Terminal
129 Second RF Amplifier
130 Second Mixer
134 Second Local Oscillator
138 Combining Unit

DETAIL DESCRIPTION OF THE PREFERRED EMBODIMENTS

Exemplary Embodiment 1

Figure 1:
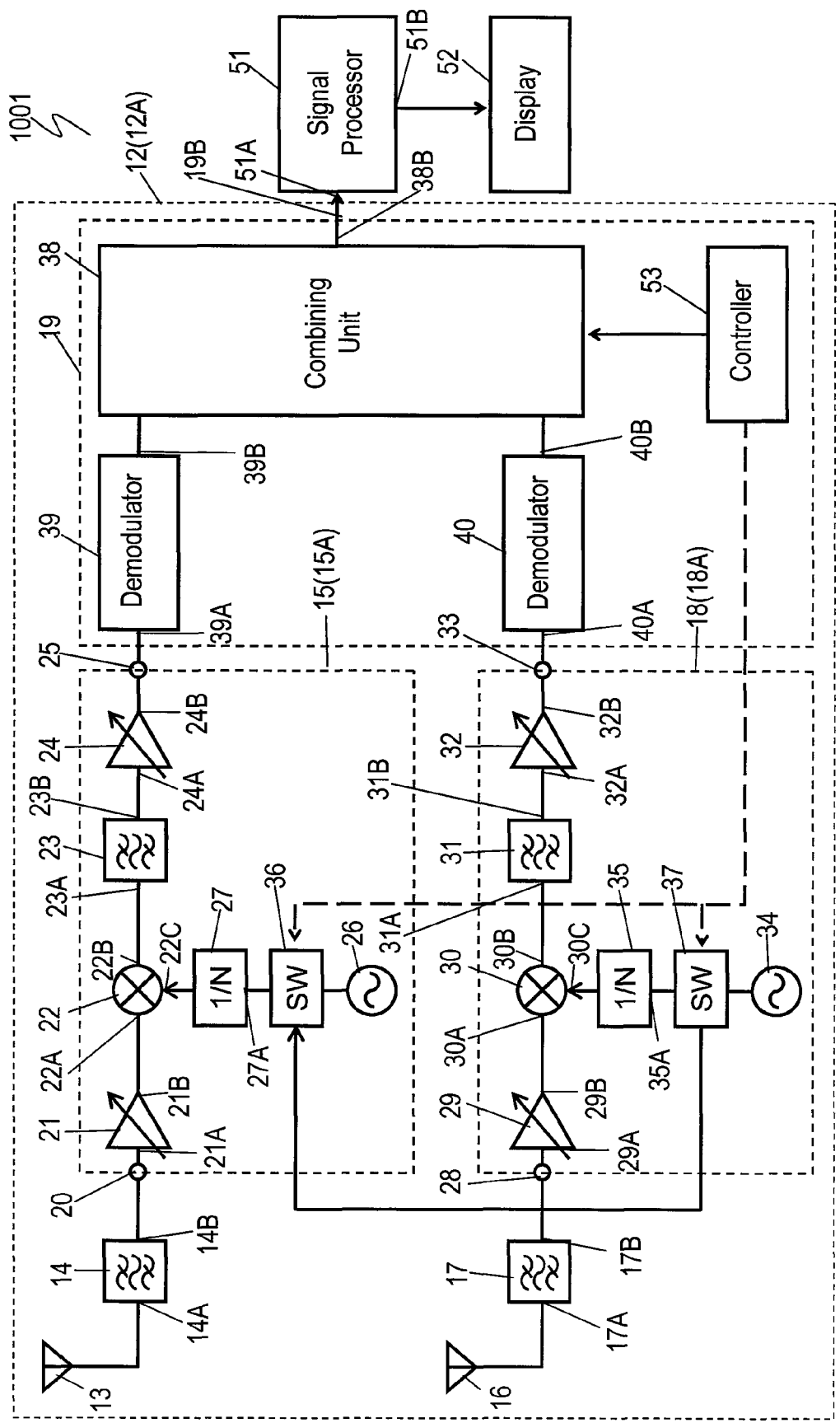
FIG. 1 is a block diagram of a receiver according to Exemplary Embodiment 1 of the present invention.

FIG. 1 is a block diagram of electronic apparatus 1001 including receiver 12 according to Embodiment 1 of the present invention. Receiver 12 includes first antenna 13, second antenna 16, first input filter 14, second input filter 17, first receiving section 15, second receiving section 18, and demodulation circuit 19. Demodulation circuit 19 is implemented by an LSI. First antenna 13 receives a television/radio broadcast wave having plural channels. First filter 14 has input port 14A connected to first antenna 13. First filter 14 has output port 14B connected to first receiving section 15. First receiving section 15 selects a particular channel having a desired frequency from the plural channels. Second antenna 16 receives the television/radio broadcast wave having the plural channels. Second input filter 17 has input port 17A connected to second antenna 16. Second input filter 17 has output port 17B connected to second receiving section 18. Second receiving section 16 selects the particular channel having the desired frequency from the plural channels. First output terminal 25 of first receiving section 15 and second output terminal 33 of second receiving section 18 are connected to demodulation circuit 19. Receiver 12 is operable to switch between a diversity receiving mode in which both of first receiving section 15 and second receiving section 18 receive the signal having the desired frequency and a single receiving mode in which only one of first receiving section 15 and second receiving section 18 receives the signal having the desired frequency. Electronic apparatus 1001 includes receiver 12, signal processor 51 having input port 51A connected to output port 19B of demodulation circuit 19, and display 52 connected to output port 51B of signal processor 51. First antenna 13 may be different from second antenna 16 in characteristics, such as directivity.

A configuration of first receiving section 15 will be described below. First antenna terminal 20 is connected to output port 14B of first input filter 14. That is, first antenna terminal 20 is arranged to be coupled to first antenna 13 via first input filter 14. First antenna terminal 20 is connected to input port 21A of first RF amplifier 21 including a transistor circuit. First RF amplifier 21 has output port 21B connected to first input port 22A of first mixer 22. An oscillation signal output from first local oscillator 26 is input to input port 27A of first frequency divider 27. First frequency divider 27 divides the frequency of the oscillation signal, and supplies the oscillation signal having the divided frequency to second input port 22C of first mixer 22. First mixer 22 heterodynes the signal of the desired frequency supplied from first input port 22A to a signal having an intermediate frequency, such as 500 kHz, with using the oscillation signal input to second input port 22C, and outputs the heterodyned signal from output port 22B. Output port 22B of first mixer 22 is connected to input port 23A of first band pass filter 23. First band pass filter 23 has output port 23B connected to input port 24A of first intermediate-frequency (IF) amplifier 24. First IF amplifier 24 has output port 24B connected to first output terminal 25.

A configuration of second receiving section 18 will be described below. Second antenna terminal 28 is connected to output port 17B of second input filter 17. That is, second antenna terminal 28 is arranged to be coupled to second antenna 16 via second input filter 17. Second antenna terminal 28 is connected to input port 29A of second RF amplifier 29 including a transistor circuit. Second RF amplifier 29 has output port 29B connected to first input port 30A of second mixer 30. An oscillation signal output from second local oscillator 34 is input to input port 35A of second frequency divider 35. Second frequency divider 35 divides the frequency of the oscillation signal, and supplies the oscillation signal having the frequency to second input port 30C of second mixer 30. Second mixer 30 heterodynes the signal of the desired frequency supplied from first input port 30A to a signal having an intermediate frequency, such as 500 kHz, with using the oscillation signal input to second input terminal 30C, and outputs the heterodyned signal from output port 30B. Output port 30B of second mixer 30 is connected to input port 31A of second band pass filter 31. Second band pass filter 31 has output port 31B connected to input port 32A of second IF amplifier 32. Second IF amplifier 32 has output port 32B connected to second output terminal 33.

Second local oscillator 34 is isolated from first RF amplifier 21 more than first local oscillator 26 is. First local oscillator 26 is isolated from second RF amplifier 29 more than second local oscillator 34 is.

Demodulation circuit 19 includes first demodulator 39 having input port 39A connected to output terminal 25 of first receiving section 15, second demodulator 40 having input port 40A connected to second output terminal 33 of second receiving section 18, combining unit 38 connected to output port 39B of first demodulator 39 and output port 40B of second demodulator 40, and controller 53 controlling combining unit 38, first switch 36 and second switch 37. First demodulator 39 demodulates a signal output from first receiving section 15 and outputs the demodulated signal. Second demodulator 40 demodulates a signal output from second receiving section 18 and outputs the demodulated signal. Combining unit 38 combines the demodulated signals output from demodulators 39 and 40, and outputs the combined signals to signal processor 51. Signal processor 51 processes the signals output from combining unit 38. Display 52 outputs an image and a sound based on the processed signals.

First switch 36 is connected between first local oscillator 26 and first frequency divider 27. First switch 36 switches between the oscillation signal output from first local oscillator 26 and the oscillation signal output from second local oscillator 34, and selectively supplies one of the oscillation signals to input port 27A of first frequency divider 27. Second switch 37 is connected between second local oscillator 34 and second frequency divider 35. Second switch 37 switches between input port 27A of first frequency divider 27 and input port 35A of second frequency divider 35, and supplies the oscillation signal output from second local oscillator 34 selectively to one of the input ports 27A and 35A.

An operation of electronic apparatus 1001 including receiver 12 according to Embodiment 1 will be described below.

Controller 53 detects a parameter, such as a carrier to noise (CN) ratio or a bit error rate (BER), indicating a receiving condition of the demodulated signal output from output port 38B of combining unit 38.

In the case that the detected parameter indicates that the receiving condition is not better than a predetermined level, controller 53 allows combining unit 38 to combine the signals output from first receiving section 15 and second receiving section 18, and supply the combined signals to signal processor 51. Thus, receiver 12 is put into the diversity receiving mode in which both of first receiving section 15 and second receiving section 18 are activated. In the diversity receiving mode, controller 53 controls switches 36 and 37 as to supply the oscillation signal output from first local oscillator 26 to first frequency divider 27 and to supply the oscillation signal output from second local oscillator 34 to second frequency divider 35. Accordingly, first mixer 22 heterodynes the signal output from first RF amplifier 21 with using the oscillation signal output from first local oscillator 26, and second mixer 30 heterodynes the signal output from second RF amplifier 29 with using the oscillation signal output from second local oscillator 34.

In the case that the detected parameter indicates that the receiving condition is better than the predetermined level, controller 53 allows combining unit 38 to supply the signal output from first receiving section 15 to signal processor 51 and prevents combining unit 38 from supplying the signal output from second receiving section 18 to signal processor 51. Thus, receiver 12 is put into the single receiving mode. In the single receiving mode, controller 53 controls switches 36 and 37 so as to supply the oscillation signal output from second local oscillator 34 to first frequency divider 27. Accordingly, first mixer 22 heterodynes the signal output from first RF amplifier 21 with using the oscillation signal output from second local oscillator 34. In the single receiving mode, controller 53 turns off first local oscillator 26 and components, such as second RF amplifier 29, second frequency divider 35, second mixer 30, and second IF amplifier 32, other than second local oscillator 34 of second receiving section 18 in order to reduce power consumption of receiver 12.

First RF amplifier 21 and second local oscillator 34 are provided in first receiving section 15 and second receiving section 18 which are different from each other, respectively. Second local oscillator 34 is isolated from first RF amplifier 21 more than first local oscillator 26 is. In the single receiving mode in which first receiving section 15 is activated while second receiving section 18 is deactivated, even when first antenna terminal 20 receives an interference signal having a frequency within a predetermined range from a sum of or a difference between the frequency of the oscillation signal from second local oscillator 34 and the desired frequency, first RF amplifier 21 does not mix the interference signal with a noise having the frequency of the oscillation signal emitted from second local oscillator 34. This prevents first RF amplifier 21 from generating a distortion signal having a frequency close to the desired frequency, accordingly improving a receiving quality of receiver 12.

The desired frequency Fd to be received, band width Bw thereof, intermediate frequency IF to be output from first mixer 22, and dividing ratio N of first frequency divider 27 provides frequency FO of the oscillation signal from local oscillator 34 as expressed by the following formula.

$$FO = N \times (Fd \pm IF)$$

Frequency FI of the interference signal is expressed by the following formula.

$$FI = N \times (Fd \pm IF) \pm Fd \pm Bw/2$$

Even when first antenna terminal 20 receives the interference signal of frequency FI, receiver 12 according to Embodiment 1 prevents first RF amplifier 21 from generating a distortion signal having a frequency close to the desired frequency.

A source generating the interference signal is another circuit provided in electronic apparatus 1001 including receiver 12. However, the source may be another electronic apparatus.

If the desired frequency is out of the predetermined range from the difference between the frequency of the interference signal and the frequency of the oscillation signal, In receiver 12 according to Embodiment 1 prevents the interference signal via first antenna terminal 20 from generating a distortion signal even in the single receiving mode in which first receiving section 15 is activated while second receiving section 18 is deactivated. In this case, accordingly, controller 53 may control switches 36 and 37 so as to supply the oscillation signal from first local oscillator 26 to first mixer 22 and to deactivate second local oscillator 34. Thus, if the desired frequency is out of the predetermined range from the difference between the frequency of the interference signal and the frequency of the oscillation signal, the oscillation signal from the local oscillator does not pass between receiving sections 15 and 18. Consequently, receiver 12 prevents the oscillation signal from being emitted externally from receiver 12.

Moreover, first input filter 14 attenuates the interference signal of the frequency within the predetermined range from the sum of or the difference between the frequency of the oscillation signal and the desired frequency. First input filter 14 may preferably be a SAW filter. First input filter 14 attenuates the interference signal, and prevents first RF amplifier 21 from generating a distortion signal having a frequency close to the desired frequency, thus improving receiving quality of receiver 12.

Receiver 12 may switch between a first single receiving mode in which first receiving section 15 is activated while second receiving section 18 is deactivated, and a second single receiving mode in which second receiving section 18 is activated while first receiving section 15 is deactivated. In the second single receiving mode, second mixer 30 heterodynes the signal from second antenna terminal 28 with using the oscillation signal output from first local oscillator 26. This configuration allows a receiving section out of the receiving sections 15 and 18 which has a higher receiving sensitivity in the single receiving mode, thus improving the receiving quality.

First receiving section 15 and second receiving section 18 are formed in integrated circuits 15A and 18A, respectively. Alternatively, first receiving section 15 and second receiving section 18 may be formed in single integrated circuit 12A, allowing receiver 12 to have a small size and a low cost.

Receiver 12 according to Embodiment 1 receives the television/radio broadcast wave, however, may be applicable to other RF signal receivers, such as a wireless device for a portable telephone, a GPS, a WLAN, or Bluetooth. Receiver 12 has a high receiving quality, and can be utilized in an electronic apparatus, such as a television set to be installed in a vehicle or a portable terminal.

Receiver 12 according to Embodiment 1 includes frequency dividers 27 and 37, but may not necessarily include frequency divider 27 or 37.

Exemplary Embodiment 2

Figure 2:
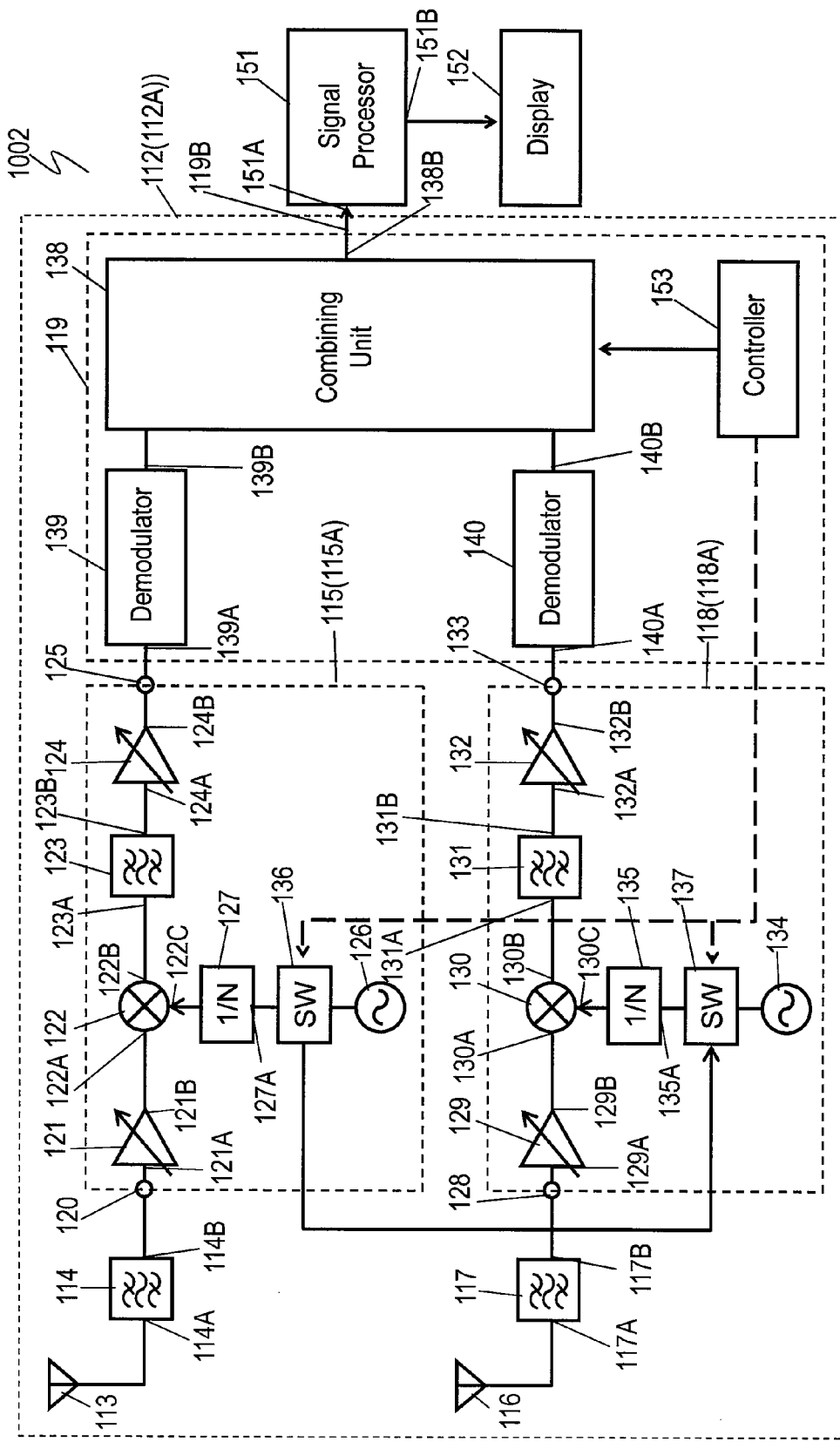
FIG. 2 is a block diagram of a receiver according to Exemplary Embodiment 2 of the invention.
Figure 3:
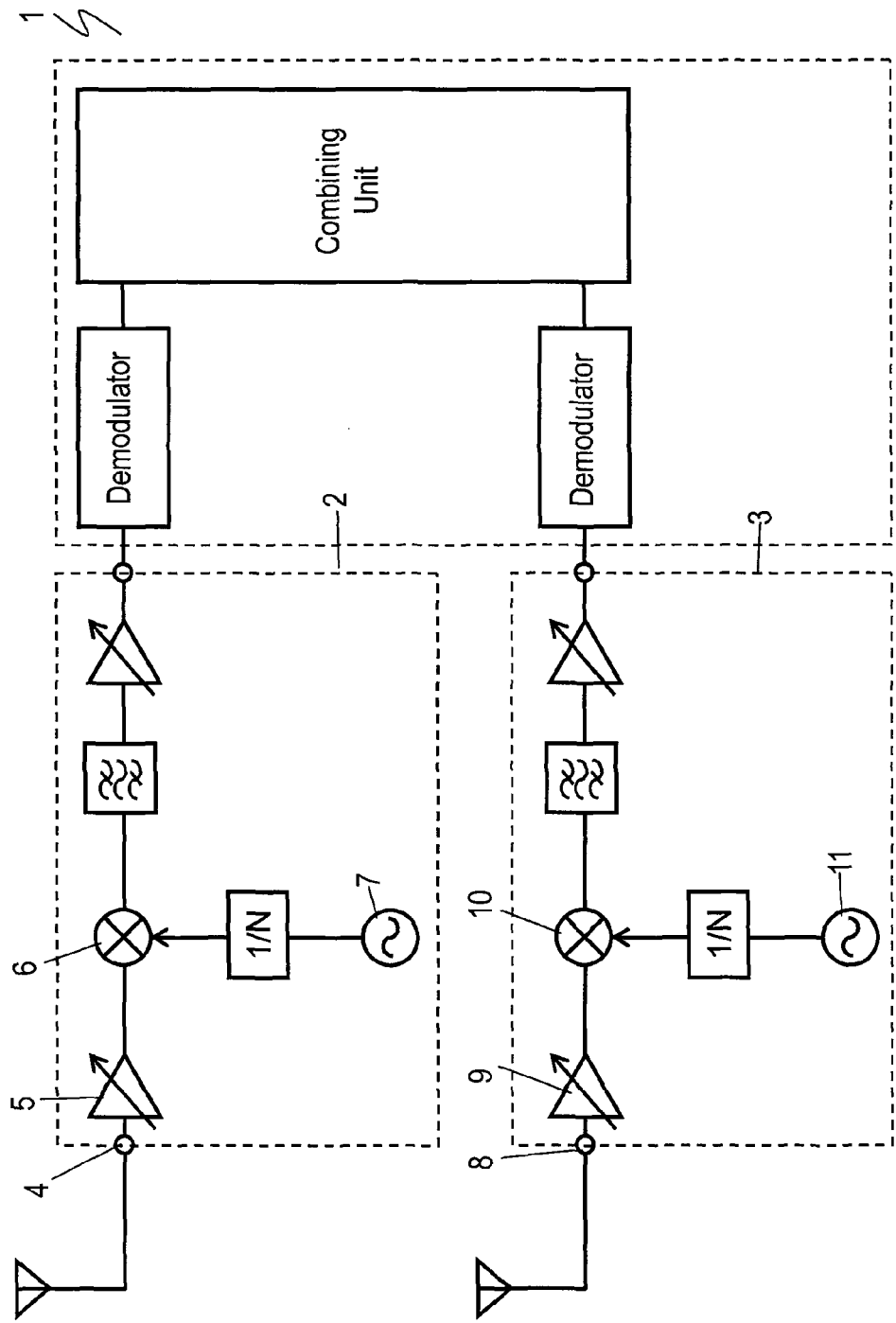
FIG. 3 is a block diagram of a conventional receiver.
Figure 4:
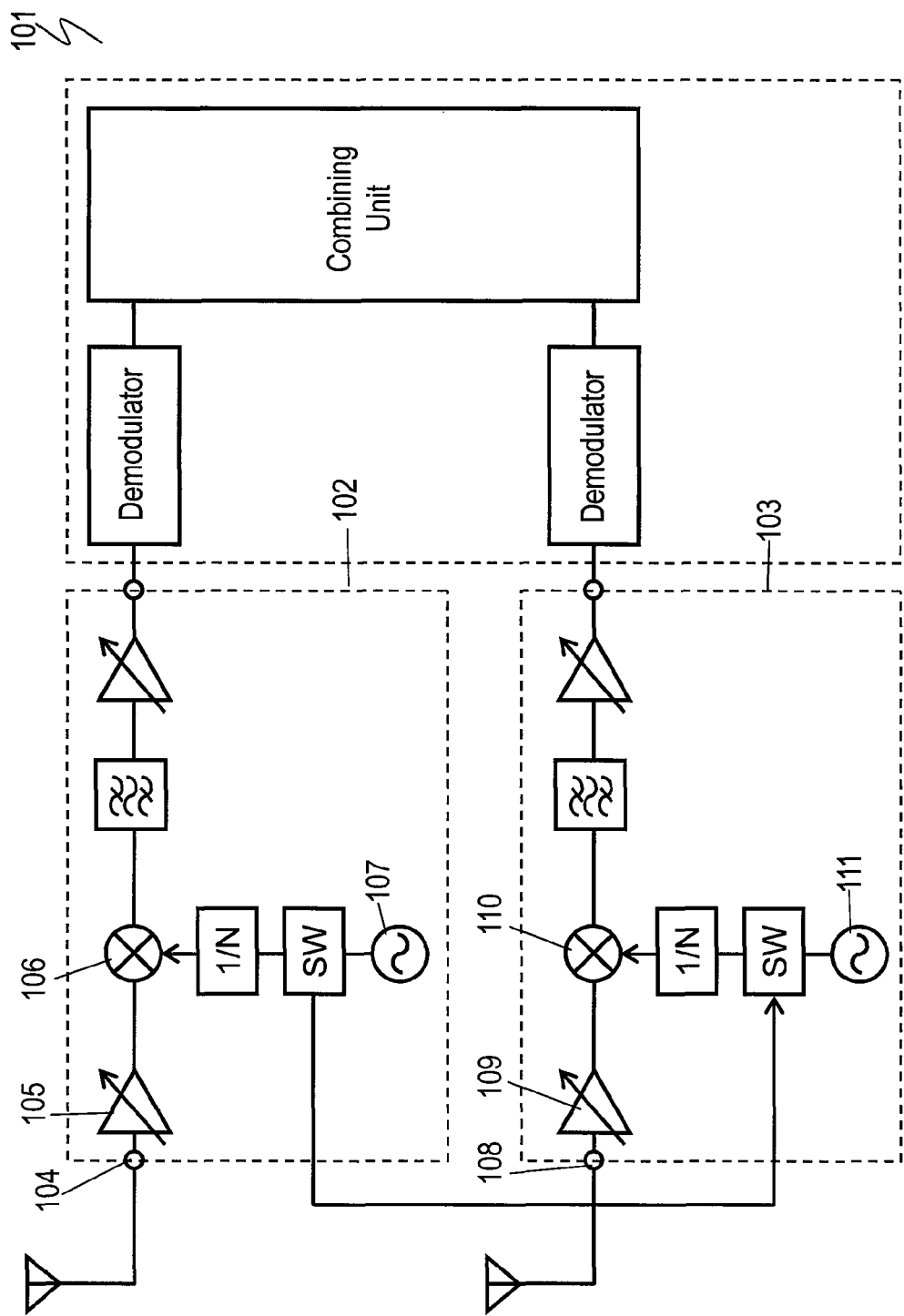
FIG. 4 is a block diagram of another conventional receiver.

FIG. 2 is a block diagram of electronic apparatus 1002 including receiver 112 according to Embodiment 2 of the present invention. Receiver 112 includes first antenna 113, second antenna 116, first input filter 114, second input filter 117, first receiving section 115, second receiving section 118, and demodulation circuit 119. Demodulation circuit 119 is implemented by an LSI. First antenna 113 receives a television/radio broadcast wave having plural channels. First filter 114 has input port 114A connected to first antenna 113. First filter 114 has output port 114B connected to first receiving section 115. First receiving section 115 selects a particular channel of a desired frequency from the plural channels. Second antenna 116 receives the television/radio broadcast wave having the plural channels. Second input filter 117 has input port 117A connected to second antenna 116. Second input filter 117 has output port 117B connected to second receiving section 118. Second receiving section 118 selects the particular channel of the desired frequency from the plural channels. First output terminal 125 of first receiving section 115 and second output terminal 133 of second receiving section 118 are connected to demodulation circuit 119. Receiver 112 can switch between a diversity receiving mode in which both of first receiving section 115 and second receiving section 118 receive the signal of the desired frequency and a single receiving mode in which first receiving section 115 receives the signal of the desired frequency. Electronic apparatus 1002 includes receiver 112, signal processor 151 having input port 151A connected to output port 119B of demodulation circuit 119, and display 152 connected to output port 151B of signal processor 151. First antenna 113 may be different from second antenna 116 in characteristics, such as directivity.

A configuration of first receiving section 115 will be described below. First antenna terminal 120 is connected to output port 114B of first input filter 114. That is, first antenna terminal 120 is arranged to be coupled to first antenna 113 via first input filter 114. First antenna terminal 120 is connected to input port 121A of first radio frequency (RF) amplifier 121 including a transistor circuit. First RF amplifier 121 has output port 121B connected to first input port 122A of first mixer 122. An oscillation signal output from first local oscillator 126 is input to input port 127A of first frequency divider 127. First frequency divider 127 divides a frequency of the oscillation signal, and supplies the oscillation signal having the divided frequency to second input port 122C of first mixer 122. First mixer 122 heterodynes the signal of the desired frequency input from first input port 122A to a signal having an intermediate frequency, such as 500 kHz, with using the oscillation signal input to second input port 122C, and outputs the signal of the intermediate frequency from output port 122B. Output port 122B of first mixer 122 is connected to input port 123A of first band pass filter 123. First band pass filter 123 has output port 123B connected to input port 124A of first IF amplifier 124. First IF amplifier 124 has output port 124B connected to first output terminal 125.

A configuration of second receiving section 118 will be described below. Second antenna terminal 128 is connected to output port 117B of second input filter 117. That is, second antenna terminal 128 is arranged to be coupled to second antenna 116 via second input filter 117. Second antenna terminal 128 is connected to input port 129A of second RF amplifier 129 including a transistor circuit. Second RF amplifier 129 has output port 129B connected to first input port 130A of second mixer 130. An oscillation signal output from second local oscillator 134 is input to input port 135A of second frequency divider 135. Second frequency divider 135 divides a frequency of the oscillation signal, and supplies the oscillation signal having the divided frequency to second input port 130C of second mixer 130. Second mixer 130 heterodynes the signal of the desired frequency received at first input port 130A to a signal having an intermediate frequency, such as 500 kHz, with using the oscillation signal received at second input terminal 130C, and outputs the signal of the intermediate frequency from output port 130B. Output port 130B of second mixer 130 is connected to input port 131A of second band pass filter 131. Second band pass filter 131 has output port 131B connected to input port 132A of second IF amplifier 132. Second IF amplifier 132 has output port 132B connected to second output terminal 133.

Second local oscillator 134 is isolated from first RF amplifier 121 more than first local oscillator 126 is. First local oscillator 126 is isolated from second RF amplifier 129 more than second local oscillator 134 is.

Demodulation circuit 119 includes first demodulator 139 having input port 139A connected to output terminal 125 of first receiving section 115, second demodulator 140 having input port 140A connected to second output terminal 133 of second receiving section 118, combining unit 138 connected to output port 139B of first demodulator 139 and output port 140B of second demodulator 140, and controller 153 controlling combining unit 138, first switch 136 and second switch 137. First demodulator 139 demodulates a signal output from first receiving section 115 to output the demodulated signal. Second demodulator 140 demodulates a signal output from second receiving section 118 to output the demodulated signal. Combining unit 138 combines the demodulated signals output from demodulators 139 and 140 to output the combined signals to signal processor 151. Signal processor 151 processes the signals output from the combining unit 138. Display 152 outputs an image and a voice based on the processed signals.

Switch 136 is connected between first local oscillator 126 and first frequency divider 127. Switch 136 switches between a mode in which the oscillation signal output from first local oscillator 126 is supplied to both of first mixer 122 and second mixer 130 and a mode in which the oscillation signal output from first local oscillator 126 is supplied only to first mixer 122 but not to second mixer 130. In other words, switch 136 switches between the mode in which the oscillation signal output from first local oscillator 126 is supplied to both of first frequency divider 127 and second frequency divider 135 and the mode in which the oscillation signal output from first local oscillator 126 is supplied only to first frequency divider 127 but not to second frequency divider 135. Switch 137 is connected between second local oscillator 134 and second frequency divider 135. Switch 137 selectively supplies, to second mixer 130, one of the oscillation signal output from first local oscillator 126 and the oscillation signal output from second local oscillator 134. In other words, switch 137 selectively supplies, to second frequency divider 135, one of the oscillation signal output from first local oscillator 126 and the oscillation signal output from second local oscillator 134.

In the diversity receiving mode in which both of first receiving section 115 and second receiving section 118 are activated to receive the signal of the desired frequency, both of first mixer 122 and second mixer 130 heterodynes the received signal with using the oscillation signal output from first local oscillator 126. In second receiving section 118, second local oscillator 134 is turned off to reduce power consumption.

In receiver 112, first antenna terminal 120 may receives an interference signal having a frequency within a predetermined range from a sum of or a difference between the frequency of the oscillation signal from local oscillator 126 and the desired frequency. In this case, if first RF amplifier 121 is not isolated sufficiently from first local oscillator 126, first RF amplifier 121 mixes this interference signal with a noise of the frequency of the oscillation signal emitted from first local oscillator 126, and generates a distortion signal having a frequency close to the desired frequency. First input filter 14 has an attenuation larger than that of second input filter 117 at the frequency of the interference signal. This arrangement prevents the first RF amplifier 121 from receiving the interference signal in the diversity receiving mode. First input filter 114 is preferably a SAW filter that attenuates the interference signal. Second input filter 117 is a low temperature co-fired ceramic (LTCC) filter or a discrete filter. Both of first input filter 114 and second input filter 117 may be SAW filters. Alternatively, each of first input filter 114 and second input filter 117 may be an LTCC filter or a discrete filter. This configuration prevents first RF amplifier 121 from mixing the interference signal with a noise having the frequency of the oscillation signal emitted from first local oscillator 126. This prevents first RF amplifier 121 from generating a distortion signal having a frequency close to the desired frequency, thus improving a receiving quality of receiver 112.

The desired frequency Fdx to be received, receiving band width Bw of the desired frequency, intermediate frequency IFy to be output from first mixer 122, and dividing ratio Nz of first frequency divider 127 provide frequency FO of the oscillation signal from local oscillator 126 as expressed by the following formula.

$$FO = Nz \times (Fdx \pm IFy)$$

Frequency FI of the interference signal is expressed by the following formula.

$$FI = Nz \times (Fdx \pm IFy) \pm Fdx \pm Bw/2$$

First input filter 114 having attenuation larger than second input filter 117 at frequency FI prevents the interference signal of frequency FI from entering to first RF amplifier 121. This prevents first RF amplifier 121 from generating a distortion signal having a frequency close to the desired frequency.

A source that generates the interference signal is another circuit in electronic apparatus 1002 including receiver 112. However, the source may be another electronic apparatus.

First input filter 114 may be incorporated in first receiving section 115. This configuration reduces the size of receiver 112.

First receiving section 115 and second receiving section 118 is formed in integrated circuit 115B and integrated circuit 118B separated from each other. Alternatively, first receiving section 115 and second receiving section 118 may be formed in single integrated circuit 112A. This arrangement reduces the size and cost of receiver 112.

Receiver 112 according to Embodiment 2 receives the television/radio broadcast wave, however, may be applicable to other RF signal receivers, such as a wireless device for a portable telephone, a GPS, a WLAN, or Bluetooth. Receiver 112 has a high receiving quality, and can be utilized in an electronic apparatus, such as a television set to be installed in a vehicle or a portable terminal.

Receiver 112 according to Embodiment 2 includes frequency dividers 127 and 137, but may not necessarily include frequency divider 127 or 137.

INDUSTRIAL APPLICABILITY

Receiver 112 has a high receiving quality, and is useful for an electronic apparatus, such as a television set to be installed in a vehicle or portable equipment.

The invention claimed is:
1. A receiver comprising:
a first receiving section including
a first antenna terminal arranged to be coupled to a first antenna receiving a signal having a desired frequency,
a first radio frequency (RF) amplifier amplifying a signal supplied from the first antenna terminal and outputting the amplified signal,
a first local oscillator outputting a first oscillation signal, and
a first mixer heterodyning a signal output from the first RF amplifier with using the first oscillation signal and outputting the heterodyned signal;
a second receiving section including
a second antenna terminal arranged to be coupled to a second antenna receiving the signal of the desired frequency,
a second RF amplifier amplifying a signal supplied from the second antenna terminal and outputting the amplified signal,
a second local oscillator outputting a second oscillation signal, and
a second mixer heterodyning a signal output from the second RF amplifier with using the second oscillation signal and outputting the heterodyned signal;
a combining unit combining the signal output from the first mixer and the signal output from the second mixer; and
a controller operable to
switch between a diversity receiving mode in which both of the first receiving section and the second receiving section are activated and a first single receiving mode in which the first receiving section is activated while the second receiving section is deactivated, and
allow the first mixer to heterodyne the signal output from the first RF amplifier with using the second oscillation signal and output the heterodyned signal in the first single receiving mode.
2. The receiver according to claim 1, wherein
the first antenna has an interference signal input thereto, and the controller is operable to
- allow the first mixer to heterodyne the signal output from the first RF amplifier with using the second oscillation signal and output the heterodyned signal in the first single receiving mode if the desired frequency is within a predetermined range from a difference between a frequency of the interference signal and a frequency of the second oscillation signal, and
- allow the first mixer to heterodyne the signal output from the first RF amplifier with using the first oscillation signal and output the heterodyned signal in the first single receiving mode if the desired frequency is out of the predetermined range from the difference between the frequency of the interference signal and the frequency of the second oscillation signal.

3. The receiver according to claim 1, wherein the controller is operable to
- switch among the diversity receiving mode, the first single receiving mode, and a second single receiving mode in which the second receiving section is activated while the RF amplifier and the first mixer of the first receiving section is deactivated, and
- allow the second mixer to heterodyne the signal output from the second RF amplifier with using the first oscillation signal and output the heterodyned signal in the second single receiving mode.

4. The receiver according to claim 1,
- wherein the first antenna receives an interference signal having a frequency within a predetermined range from a sum of or a difference of a frequency of the first oscillation signal and the desired frequency,
- said receiver further comprising a first input filter connected between the first antenna and the first RF amplifier as to attenuate the interference signal.

5. The receiver according to claim 4, wherein the first input filter comprises a SAW filter.

6. The receiver according to claim 1, further comprising integrated circuits having the first receiving section and the second receiving section formed therein, respectively.

7. The receiver according to claim 1, further comprising an integrated circuit having the first receiving section and the second receiving section formed therein.

8. An electronic apparatus comprising:
- the receiver according to claim 1; and
- a signal processor processing a signal output from the combining unit.

9. The receiver according to claim 1, wherein the controller allows the first mixer to heterodyne the signal output from the first RF amplifier using the first oscillation signal and allows the second mixer to heterodyne the signal output from the second RF amplifier using the second oscillation signal and output the respective heterodyne signals in the diversity receiving mode.

10. A receiver comprising:
- a first receiving section including
    - a first antenna terminal arranged to be coupled to a first antenna receiving a signal having a desired frequency,
    - a first radio frequency (RF) amplifier amplifying a signal supplied from the first antenna terminal and outputting the amplified signal,
    - a first local oscillator outputting a first oscillation signal, and
    - a first mixer heterodyning the signal output from the first RF amplifier with using the first oscillation signal and outputting the heterodyned signal;
- a first input filter connected between the first antenna and the first RF amplifier;
- a second receiving section including
    - a second antenna terminal arranged to be coupled to a second antenna receiving the signal having the desired frequency,
    - a second RF amplifier amplifying a signal supplied from the second antenna terminal and outputting the amplified signal,
    - a second local oscillator outputting a second oscillation signal, and
    - a second mixer heterodyning the signal output from the second RF amplifier with using the second oscillation signal and outputting the heterodyned signal;
- a combining unit combining the signal output from the first mixer and the signal output from the second mixer; and
- a controller operable to
    - switch between a diversity receiving mode in which both of the first receiving section and the second receiving section are activated and a first single receiving mode in which the first receiving section is activated while the second receiving section is deactivated,
    - allow the first mixer to heterodyne the signal output from the first RF amplifier with using the first oscillation signal and output the heterodyned signal, and
    - allow the second mixer to heterodyne the signal output from the second RF amplifier with using the first oscillation signal and output the heterodyned signal in the diversity receiving mode, wherein
- the first antenna receives an interference signal having a frequency within a predetermined range from a sum of or a difference between a frequency of the first oscillation signal and the desired frequency, and
- the first input filter attenuates the interference signal.

11. The receiver according to claim 10, wherein the first input filter comprises a SAW filter.

12. An electronic apparatus comprising:
the receiver according to claim 11; and
a signal processor processing a signal output from the combining unit.

13. The receiver according to claim 10, further comprising a second input filter connected between the second antenna and the second RF amplifier, wherein the first input filter has an attenuation larger than the second input filter at the frequency of the interference signal.

14. The receiver according to claim 13, wherein the first input filter comprises a SAW filter.

15. The receiver according to claim 13, wherein the second input filter comprises a low temperature co-fired ceramic filter or a discrete filter.

16. The receiver according to claim 10, wherein the first input filter is incorporated in the first receiving section.

17. The receiver according to claim 10, further comprising integrated circuits having the first receiving section and the second receiving section formed therein.

18. The receiver according to claim 10, further comprising an integrated circuit having the first receiving section and the second receiving section formed therein.

19. An electronic apparatus comprising:
the receiver according to claim 10; and
a signal processor processing a signal output from the combining unit.

* * * * *